(12) United States Patent
Bendich et al.

(10) Patent No.: US 7,769,861 B2
(45) Date of Patent: Aug. 3, 2010

(54) APPARATUS, SYSTEM, AND METHOD FOR MODELING FOR STORAGE PROVISIONING

(75) Inventors: Justin Russell Bendich, Austin, TX (US); David Maxwell Cannon, Tucson, AR (US); Alireza Razzaghi Daryan, Los Gatos, CA (US); Brian Augustine Delaire, Fremont, CA (US); Barry Lynn Eberly, San Jose, CA (US); David Wilson Groves, San Jose, CA (US); Srinivas Jandhyala, Austin, TX (US); Michael Loren Lamb, San Jose, CA (US); Edward Martin McCrickard, Austin, TX (US); Raymond Matthew Swank, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 1367 days.

(21) Appl. No.: 10/720,567

(22) Filed: Nov. 24, 2003

(65) Prior Publication Data

US 2005/0114438 A1    May 26, 2005

(51) Int. Cl.
G06F 12/00 (2006.01)
G06F 15/167 (2006.01)
G06F 15/173 (2006.01)
G06F 9/46 (2006.01)

(52) U.S. Cl. ............... 709/226; 709/215; 711/170; 711/148; 718/104

(58) Field of Classification Search .......... 709/203, 709/215, 226; 711/170, 114, 148; 718/104
See application file for complete search history.

(56) References Cited

U.S. PATENT DOCUMENTS

| 6,195,622 | B1 | 2/2001 | Altschuler et al. ............. 703/2 |
| 6,353,846 | B1 | 3/2002 | Fleeson ..................... 709/104 |
| 6,381,579 | B1 | 4/2002 | Gervais et al. ................ 705/8 |
| 7,415,506 | B2 * | 8/2008 | Gajjar et al. ................ 709/215 |
| 7,480,912 | B2 * | 1/2009 | Arnold et al. ............... 718/104 |
| 2002/0133591 | A1 | 9/2002 | Makarios et al. ........... 709/225 |
| 2002/0156865 | A1 | 10/2002 | Rajarajan et al. ........... 709/217 |
| 2002/0156904 | A1 | 10/2002 | Gullotta et al. ............. 709/229 |
| 2002/0169876 | A1 | 11/2002 | Curie et al. ................ 709/226 |
| 2002/0174306 | A1 * | 11/2002 | Gajjar et al. ................ 711/148 |
| 2002/0184535 | A1 | 12/2002 | Moaven et al. ............. 713/202 |
| 2003/0018656 | A1 | 1/2003 | Schutzman et al. ......... 707/203 |
| 2003/0078934 | A1 | 4/2003 | Cappellucci et al. ........ 707/101 |
| 2003/0093672 | A1 | 5/2003 | Cichowlas .................. 713/168 |
| 2004/0123063 | A1 * | 6/2004 | Dalal et al. ................. 711/170 |

* cited by examiner

*Primary Examiner*—George C Neurauter, Jr.
*Assistant Examiner*—Anish Sikri
(74) *Attorney, Agent, or Firm*—Kunzler Needham Massey & Thorpe

(57) ABSTRACT

An apparatus, system, and method are disclosed for provisioning storage resources according to a modeling policy. The modeling apparatus includes a monitoring module, a policy module, and a provisioning module. The monitoring module monitors the storage resources on the storage system. The policy module stores and maintains storage management, storage provisioning, and storage resource modeling policies. A user may access and specify these policies via a specification module. The provisioning module automatically provisions new storage resources, such as logical unit numbers (LUNs) according to the storage provisioning policies and modeling policies. The modeling policy defines a modeling strategy by which new storage resources are provisioned to include some or all of the attributes of a model storage resource.

17 Claims, 7 Drawing Sheets

APPARATUS, SYSTEM, AND METHOD FOR MODELING FOR STORAGE PROVISIONING

BACKGROUND OF THE INVENTION

1. Field of the Invention

This invention relates to provisioning storage in a storage system and more particularly relates to provisioning storage resources by modeling new storage units after existing storage units.

2. Description of the Related Art

Data storage systems facilitate storing large amounts of data for multiple users across one or more networks. In order to manage the flow of data within a large data storage system, a storage resource manager server may be necessary to manage the storage resources throughout the storage system, including monitoring storage assets, monitoring storage usage, reporting events, and provisioning storage resources to clients and applications to satisfy storage capacity requirements for each client.

Provisioning storage in a storage system refers to allocating physical memory for a specific application or client. One way that a storage resource manager server provisions storage resources is by making available resources, such as logical unit numbers (LUNs) available to the application or client. The storage resource manager server also may create new logical unit numbers (LUNs) prior to assigning them to a specific client.

When provisioning resources throughout the storage system, the storage resource manager server conventionally must specify certain parameters for each LUN. These parameters may include the storage server, the storage pool, the connectivity between the client and the storage server, and the RAID type of the storage pool. Additionally, the parameters for newly provisioned LUNs may be client-specific—each client may require or perform best using a certain size, type, or otherwise distinct LUN structure.

Conventionally, a storage system administrator must manually provide all of the parameter inputs associated with a specific client, application, and storage resource. This creates significant demand on the storage system administrator to manage the potentially unique attributes associated with each of the specific storage resources. Furthermore, the uniqueness of the attributes of various storage resources makes it very difficult, even impractical, to specify a general, static attribute policy that would apply to all newly provisioned LUNs.

What is needed are a process, apparatus, and system that automatically provision storage resources according to a policy, thereby relieving the storage system administrator of the manual entry of detailed provisioning policies and unique storage resource attributes.

BRIEF SUMMARY OF THE INVENTION

The present invention has been developed in response to the present state of the art and, in particular, in response to the problems and needs in the art that have not yet been fully solved by currently available storage systems and storage resource manager servers. Accordingly, the present invention has been developed to provide a process, apparatus, and system for provisioning storage resources according to a modeling policy that overcome many or all of the above-discussed shortcomings in the art.

The modeling apparatus for provisioning storage resources according to a modeling policy is provided with a logic unit containing a plurality of modules configured to functionally execute the necessary steps of provisioning storage resources according to a modeling policy. These modules in the described embodiments include monitoring module, a policy module, a provisioning module, a specification module, and a user interface module.

In one embodiment, the monitoring module is configured to monitor the storage resources on the storage system, including initiating an alert at the storage resource manager server when additional storage is required. The policy module, in one embodiment, is configured to store one or more storage management policies, including storage provisioning policies and a modeling policy. The modeling policy defines the modeling strategy for selecting a model storage resource and creating the newly provisioned storage resource in a storage pool on a storage server. The provisioning module is configured, in one embodiment, to provision the new storage resource according to the modeling policy maintained by the policy module.

In a further embodiment, the specification module and user interface module are configured to allow a user, such as the storage system administrator, to access and revise the storage management policies, storage provisioning policies, and modeling policies.

A system of the present invention is also presented for provisioning storage resources according to a modeling policy. The system may be embodied in a storage resource manager server within a storage system. In particular, the system, in one embodiment, includes a client connected to the storage resource manager server that, in turn, is connected to one or more storage servers. The storage resource manager server is further configured to monitor the storage resources on the storage system and automatically provision new storage resources as necessary to accommodate client storage requirements.

The system may further include other features of the modeling apparatus as described above. Additionally, the system may include a storage resource manager repository that is configured to store the storage management, provisioning, and modeling policies.

A storage medium having computer code is also presented and configured to execute a process of the present invention for provisioning storage resources according to a modeling policy. The process in the disclosed embodiments substantially includes the steps necessary to carry out the functions presented above with respect to the operation of the described apparatus and system. In one embodiment, the process includes monitoring the storage resources on the storage system, storing the various policies, and automatically provisioning new storage resources according the modeling policy.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
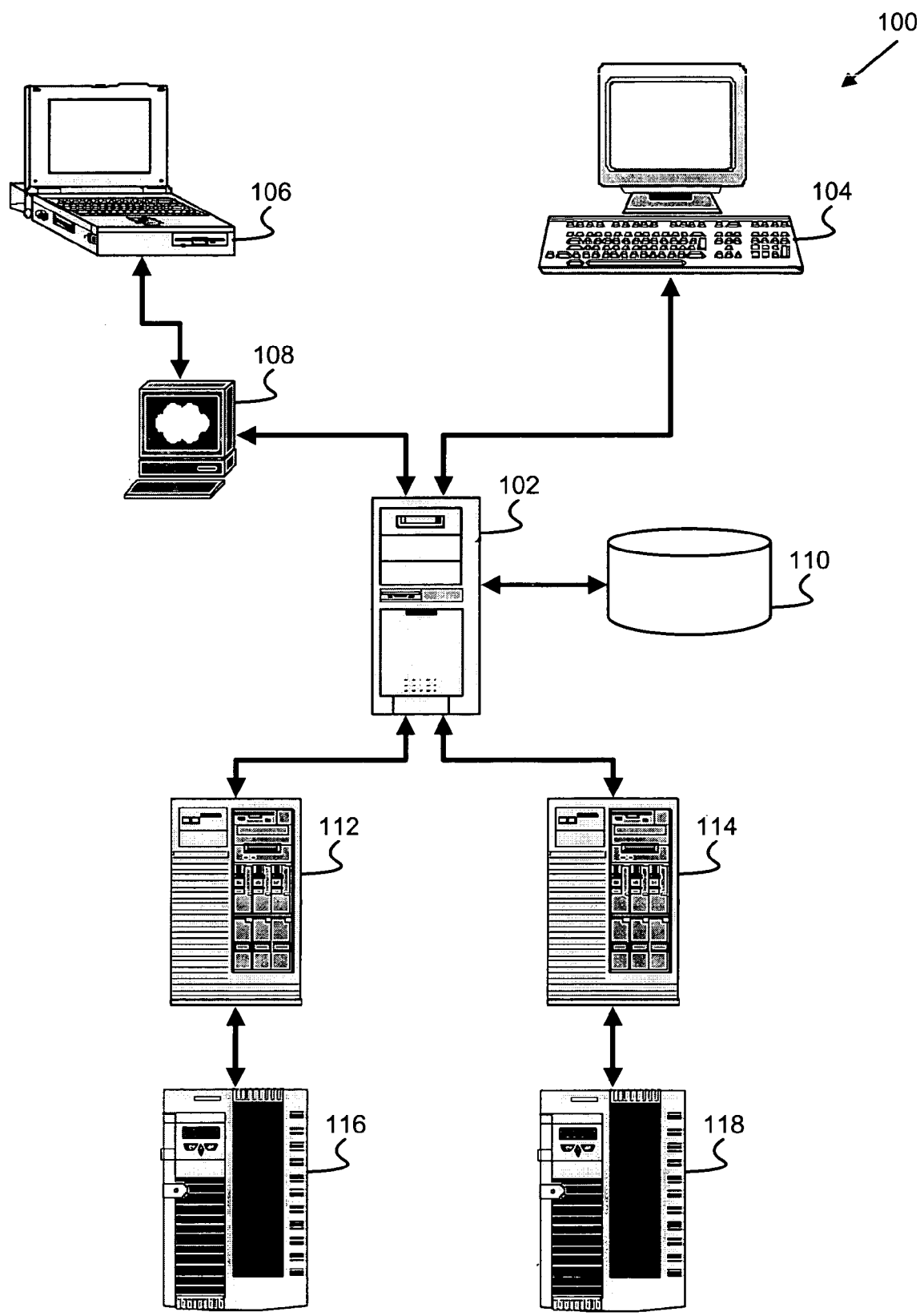
FIG. 1 is a schematic block diagram illustrating one embodiment of a storage system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different non-transitory storage devices or non-transitory computer readable storage medium.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a storage system 100. The illustrated storage system 100 includes a storage resource manager server 102. The storage resource manager server 102 may be configured, in one embodiment, to manager the storage resources in the storage system 100, including allocating storage for specific client machines upon receiving a request from a user or software application. The storage resource manager server 102 further may be configured to monitor storage resource usage on the storage system 100, issue administrative commands to other system components, automatically extend file systems, and provision storage resources, such as logical unit numbers (LUNs).

The storage system 100 also includes a client 104 that is connected directly to the storage resource manager server 102. In a further embodiment, the storage system 100 may include a remote client 106 that is configured to access the storage resource manager server 102 via a web server 108. The web server 108, in one embodiment, may run on the same physical server as the storage resource manager server 102. The client 104 and remote client 106 are representative of some of the types of clients that may access the storage resource manager server 102. In a typical storage system 100, a plurality of clients 104 and remote clients 106 may be connected to the storage resource manager server 102 via multiple network connections.

The illustrated storage system 100 also includes a storage resource manager repository 110, such as a database, that is configured to store storage management data. For example, the storage resource manager repository 110 may be configured to store a plurality of storage management policies, including storage provisioning policies, that are used in managing the storage system 100. In one embodiment, the storage resource manager repository 110 may reside near the storage manager resource server 102. Alternately, the storage resource manager repository 110 may reside in a remote database management system (RDBMS).

The storage resource manager server 102 manages storage, in one embodiment, via one or more storage resource manager agents 112, 114, in managed storage servers 116, 118. Alternately, the storage resource manager server 102 may directly (via the Common Information Model (CIM) industry standard interface) manage and access data stored on a storage server 116, 118 without communicating via a storage resource manager agent 112, 114. The storage resource manager agents 112, 114, may be configured to probe their operating systems and scan their file systems to assist the storage resource manager server 102 in managing the storage system 100.

Figure 2:
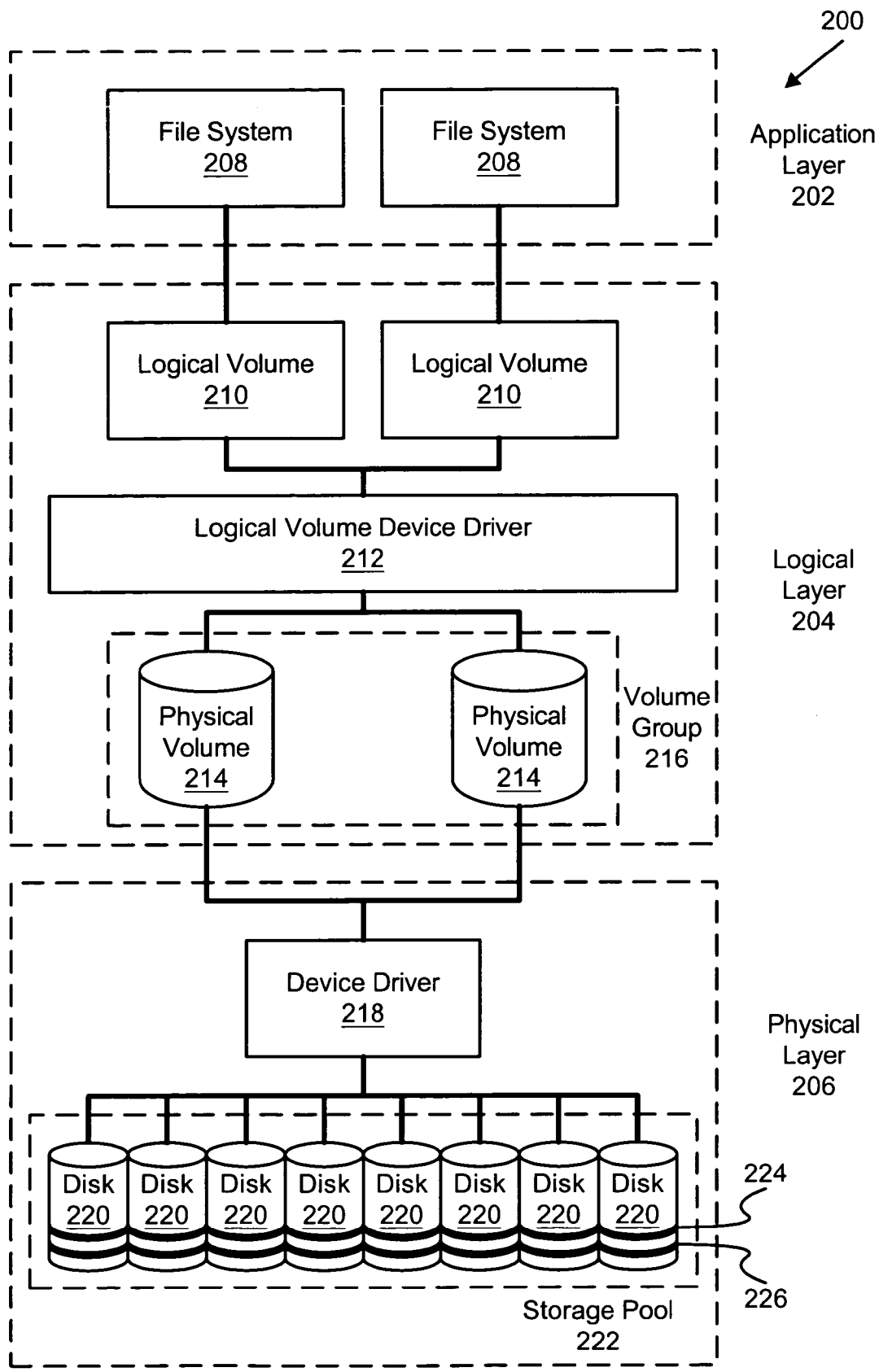
FIG. 2 is a schematic block diagram illustrating one embodiment of a storage management environment in accordance with the present invention.

FIG. 2 depicts a representation of a storage management environment 200 that may exist on the storage resource manager agents 112, 114, and the storage system 100 of FIG. 1. The depicted storage management environment 200 includes three layers, namely, an application layer 202, a logical layer 204, and a physical layer 206. In one embodiment, the application layer 202 is a file system 208. A file system 208 is a set of logical structures and software routines that organize and control access to data on one or more physical memory devices. For example, a file system 208 may employ a hierarchical structure of files and directories that correspond to and identify the actual location of data on a hard disk drive.

Application programs execute within the application layer 202 using logical blocks. A logical block is a unit of data that includes a specified number of bytes of data. For example, one logical block may include 512 bytes of data. The application programs executing within the application layer 202 often need to store and access data within the physical layer 206. The logical layer 204 represents a mapping layer that operates on logical volumes 210 that include one or more logical blocks. A logical volume 210 is defined in terms of the information it contains rather than the physical attributes of the data. A logical volume 210 represents the data as used by an application program rather than the physical placement of the data in a storage device.

The logical layer 204, in one embodiment, includes a logical volume device driver (LVDD) 212 that is a pseudo-device driver that operates on the logical volumes 210 and manages and processes all input/output (I/O). The logical volume device driver (LVDD) 212 maps the logical volume 210 to a physical volume 214 that represents the physical placement of the data in a storage device. Each physical volume 214 may be assigned a name and a physical volume identifier (PVID) that is a type of serial number that identifies the physical volume 214. The physical volume identifier (PVID) is often a combination of a server's serial number and the date that the physical volume 214 is created. An equivalent term for a physical volume 214 is a logical unit number (LUN). Reference to a physical volume 214 or LUN 214 within this application is understood to refer to a physical volume 214.

One or more physical volumes 214 may be grouped together to form a volume group 216. A physical volume 214 may be added or removed from the volume group 216 after the volume group 216 has been created. Each volume group 216 may be assigned a name and a volume group identifier (VGID) that is similar to the physical volume identifier (PVID) for a physical volume 214. The volume group identifier (VGID) often is used as a base for a logical volume identifier (LVID) of a logical volume 210 within the volume group 216.

Data stored on a physical volume 214 is transferred via a device driver 218 to or from a physical disk 220. The device driver 218, in one embodiment, is a small computer system interface (SCSI) disk device driver. In an alternative embodiment, the device driver 218 may be a serial storage architecture (SSA) disk device driver. The physical disk 220 may be a magnetic hard disk drive (HDD), an optical drive, or any other type of storage device.

The illustrated physical disks 220 include a first stripe 224 and a second stripe 226. A stripe refers to a collection of memory that corresponds to a LUN 214. One stripe typically includes a small portion of memory from a plurality of storage devices. For example, the first stripe 224 includes a portion of memory from each of the disks 220 in the storage pool 222. Similarly, the second stripe 226 includes a different portion of memory from each of the disks 220 in the storage pool 222.

When the physical memory allocated to a specific file system 208 is substantially exhausted because of the amount of data stored within the file system 208, the storage resource manager server 102 of FIG. 1 may provision one or more LUNs 214 to extend the file system 208. When the storage resource manager server 102 provisions a LUN 214 for a file system 208, the storage resource manager server 102 may create and/or allocate an additional physical stripe 224 within a storage pool 222. Preferably, the provisioned LUN 214 is from the same storage pool 222 as other LUNs 214 allocated to the same file system 208. Alternately, the provisioned LUN 214 may be from a different storage pool 222 on the same storage server 116, 118. In a further embodiment, the provisioned LUN 214 may be from a different storage pool 222 on a different storage server 116, 118.

Figure 3:
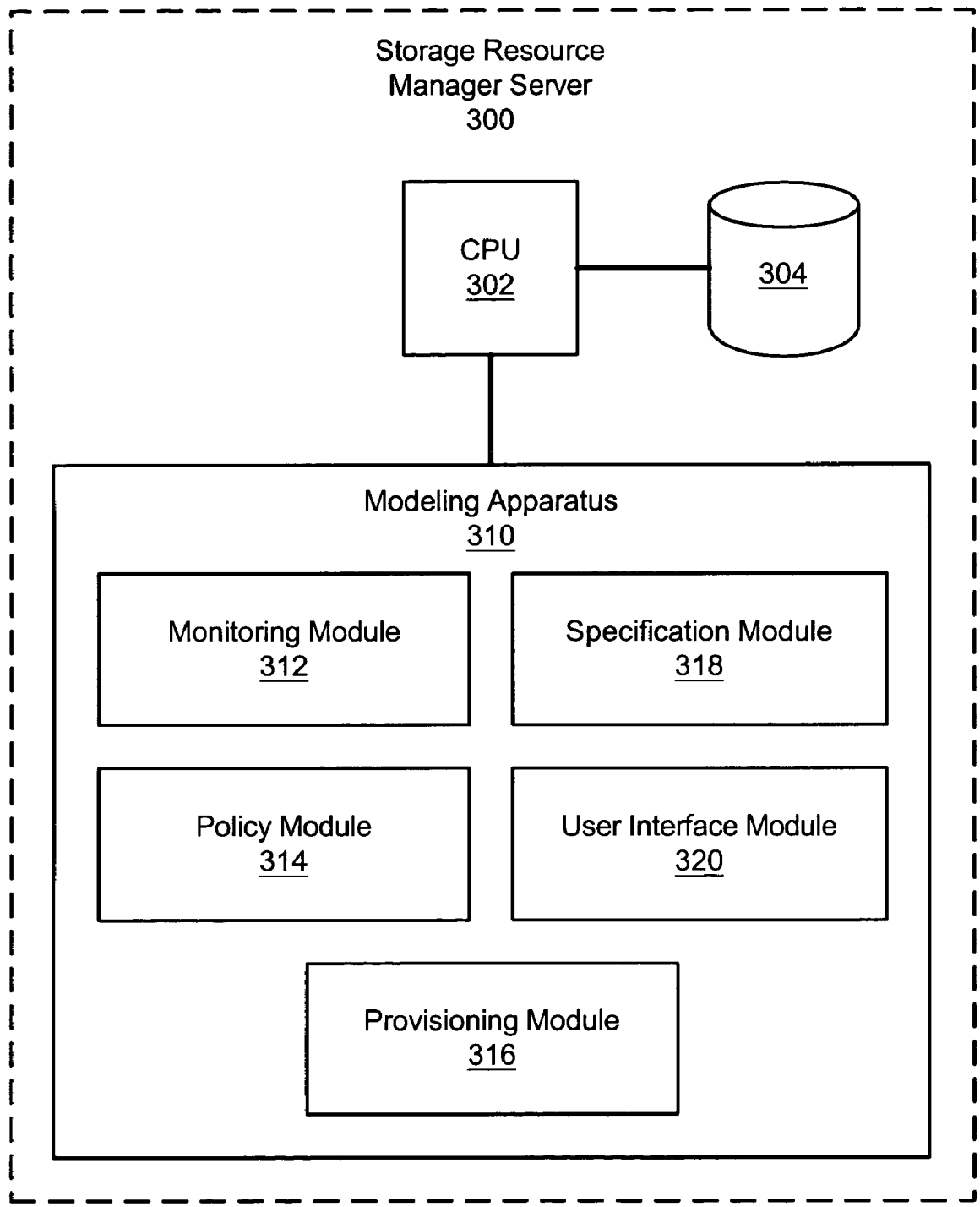
FIG. 3 is a schematic block diagram illustrating one embodiment of a storage resource manager server in accordance with the present invention.

FIG. 3 depicts one embodiment of a storage resource manager server 300 that is substantially similar to the storage resource manager server 102 of FIG. 1. The illustrated storage resource manager server 300 includes a central processing unit (CPU) 302, a local memory device 304, and a modeling apparatus 310.

The modeling apparatus 310 is configured, in one embodiment, to model newly provisioned LUNs 214 after existing LUNs 214 according to a modeling policy. The illustrated modeling apparatus 310 includes a monitoring module 312, a policy module 314, a provisioning module 316, a specification module 318, and a user interface module 320.

The monitoring module 312, in one embodiment, is configured to monitor the storage resources on the storage system 100. As described above, the monitoring module 312 may employ one or more storage resource manager agents 112, 114 to probe and scan the storage servers 116, 118. The monitoring module 312, in a further embodiment, also may be configured to monitor attributes associated with a specific LUN 214. For example, the monitoring module 312 may monitor the storage server 116, 118 and storage pool 222 in which the LUN 214 is physically located. Similarly, the monitoring module 312 may monitor the type of redundant array of independent disks (RAID) structure implemented in the storage pool 222. The monitoring module 312 also may monitor the connectivity paths, such as whether there is a single path or redundant paths, between the storage servers 116, 118 and the clients 104, 106 on which the file systems 208 are implemented.

The policy module 314, in one embodiment, is configured to store and maintain a plurality of storage management policies that direct the storage resource manager server 102 how to manage the storage system 100. As discussed above, the storage management policies may be stored on the storage resource manager repository 110 of FIG. 1. The storage management policies may include one or more policies directed to provisioning LUNs 214 within the storage system 100. In particular, the storage management policies may include a plurality of modeling policies that indicate how to model a new LUN 214 after an existing LUN 214.

In one embodiment, the modeling policy may specify a storage location, such as a storage pool 222, in which to create the new LUN 214. In a further embodiment, the modeling policy may specify a model group containing one or more existing LUNs 214. One of the existing LUNs 214 from the model group may be used as a model LUN 214. The new LUN 214 may be provisioned so that the new LUN 214 includes some or all of the attributes of the model LUN 214. For example, the new LUN 214 may be provisioned according to a preferred minimum size parameter that is modeled after the size of the existing LUN 214. The provisioning module 316, in one embodiment, is configured to provision a new LUN 214 according to the modeling policy.

The specification module 318, in one embodiment, is configured to allow a user to access and specify one or more of the storage management policies, including the storage provisioning policies and the modeling policies. Likewise, the user interface module 320 is configured, in one embodiment, to allow a user to access the storage management policies via the specification module 318.

Figure 4A:
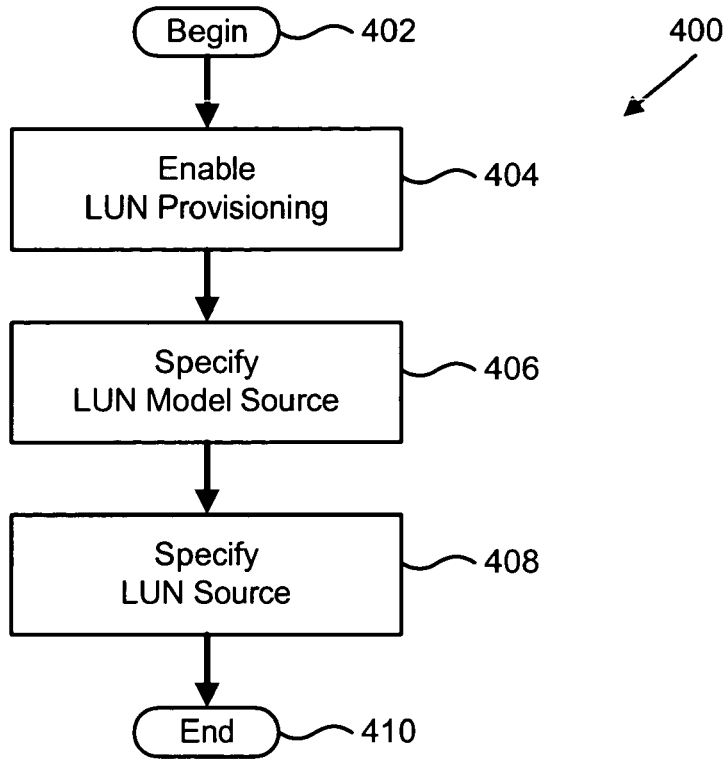
FIG. 4a is a schematic flow chart diagram illustrating one embodiment of a modeling specification process in accordance with the present invention.

FIG. 4a depicts one embodiment of a modeling specification process 400 that may be implemented, in one embodiment, on the storage resource manager server 300 of FIG. 3. The illustrated modeling specification process 400 begins 402 by enabling 404 automatic LUN 214 provisioning. In other words, the storage system administrator may specify that the storage resource manager server 102 will automatically provision LUNs 214 within the storage system 100 as necessary. If automatic LUN 214 provisioning is not enabled, the system administrator will have to manually provision LUNs 214 in order to meet storage needs of the storage system 100. In further embodiments, the enablement designation of automatic LUN 214 provisioning may be done globally, by storage server 116, 118, by client user, by file space, or another similar classification.

The modeling specification process 400 also allows a user to specify 406 the model group after which the new provisioned LUN 214 should be modeled. Preferably, the model group is not static, but is specified so that a model group may be dynamically chosen depending on the file system 208 being extended. For example, in one embodiment, the model group may be specified so that the model LUN 214 is a LUN 214 within the volume group 216 of the file system 208 that is being extended. Alternately, the model group may be specified so that the model LUN 214 is a LUN 214 located anywhere on the same client 104, 106 as the file system 208 being extended. In the latter case, the model LUN 214 may or may not be in the same volume group 216 of the file system 208 that is being extended.

The modeling specification process 400 then allows a user to specify 408 the storage location in which the new LUN 214 is physically stored, such as in the first or second stripes 224, 226 of FIG. 1. Preferably, the storage location is also specified in a dynamic, rather than static, manner. Instead of specifying a fixed storage pool 222, for example, in which all provisioned LUNs 214 are physically located, the storage location may be specified in relation to the physical storage location of the model LUN 214. For example, in one embodiment, the storage location may be specified so that the provisioned LUN 214 is stored in the same storage pool 222 as the model LUN 214. Alternately, the storage location may be specified so that the provisioned LUN 214 is stored in the same storage server 116, 118 as the model LUN 214. In the latter case, the specified storage location of the provisioned LUN 214 may or may not be in the same storage pool 222 as the model LUN 214.

After enabling 404 automatic LUN 214 provisioning, specifying 406 the model group, and specifying 408 the storage location, the illustrated modeling specification process 400 ends 410. In alternate embodiments of the modeling specification process 400, a user also may specify other attributes of the model and provisioned LUNs 214, including size, connectivity, and so forth. A further embodiment also may include storing the modeling specifications in the storage resource manager repository 110.

Figure 4B:
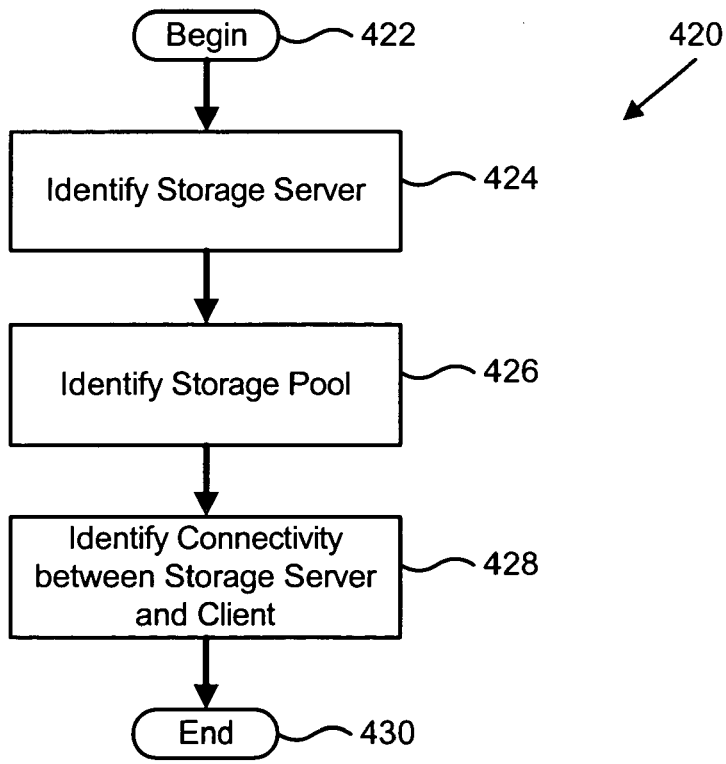
FIG. 4b is a schematic flow chart diagram illustrating one embodiment of a modeling identification process in accordance with the present invention.

FIG. 4b depicts one embodiment of a modeling identification process 420 that may be implemented, in one embodiment, on the storage resource manager server 300 of FIG. 3. Specific examples of when the modeling identification process 420 may be invoked are discussed with regard to the provisioning process 500 depicted in FIGS. 5-7.

The illustrated modeling identification process 420 begins 422 when the monitoring module 312 identifies 424 the storage server 116, 118 on which the model LUN 214 is located. The monitoring module 312 also may identify 426 the storage pool 222 in which the model LUN 214 is located.

Furthermore, the monitoring module 312 may identify 428 the connectivity attributes associated with the single connection or redundant connections between the specific client 104, 106 and storage server 116, 118. After identifying 424, 426, 428, the storage server 116, 118, storage pool 222, and connectivity, the illustrated modeling identification process 420 ends 430.

Figure 5:
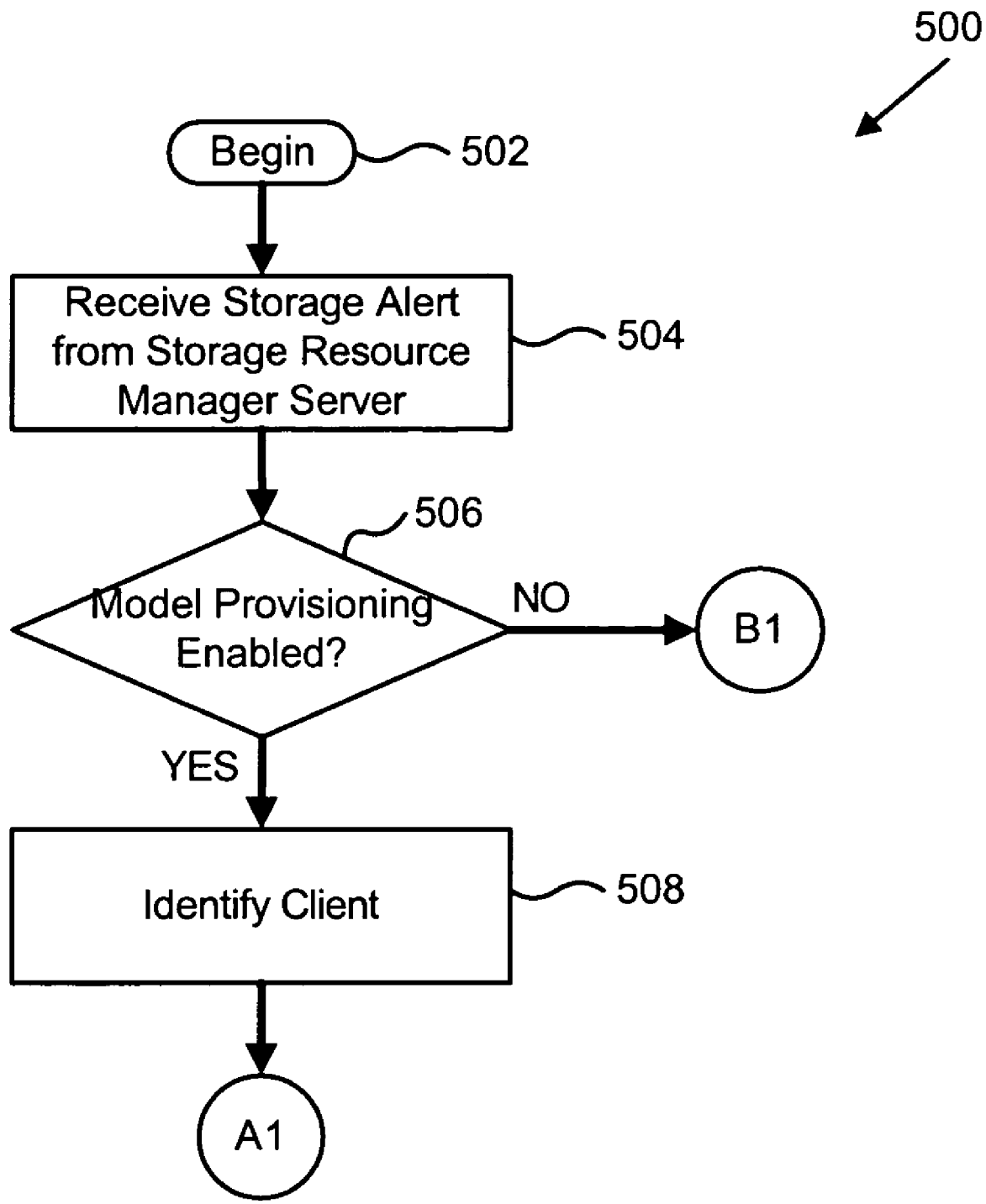
FIGS. 5-7 are a schematic flow chart diagram illustrating one embodiment of a provisioning process in accordance with the present invention.
Figure 6:
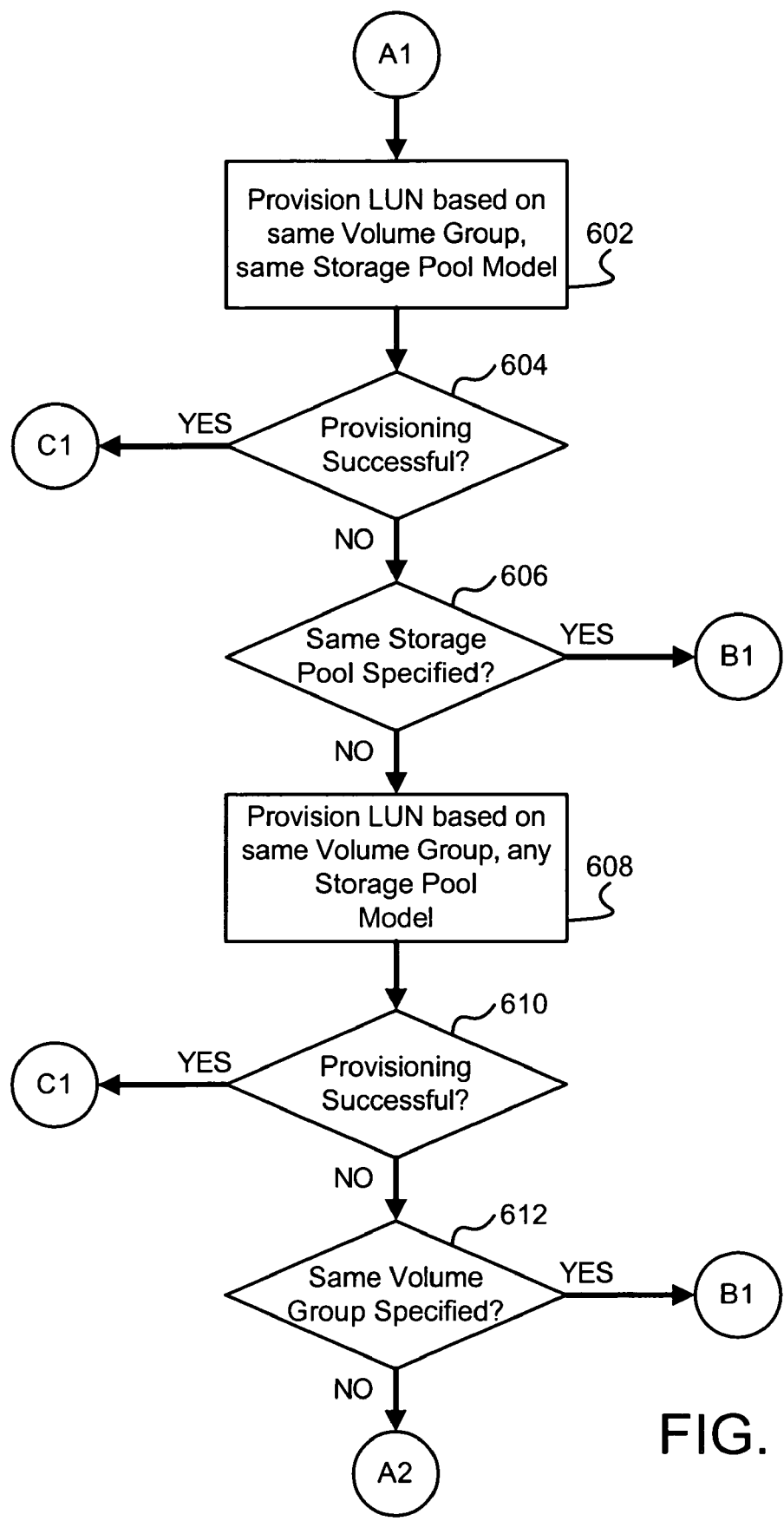
Figure 7:
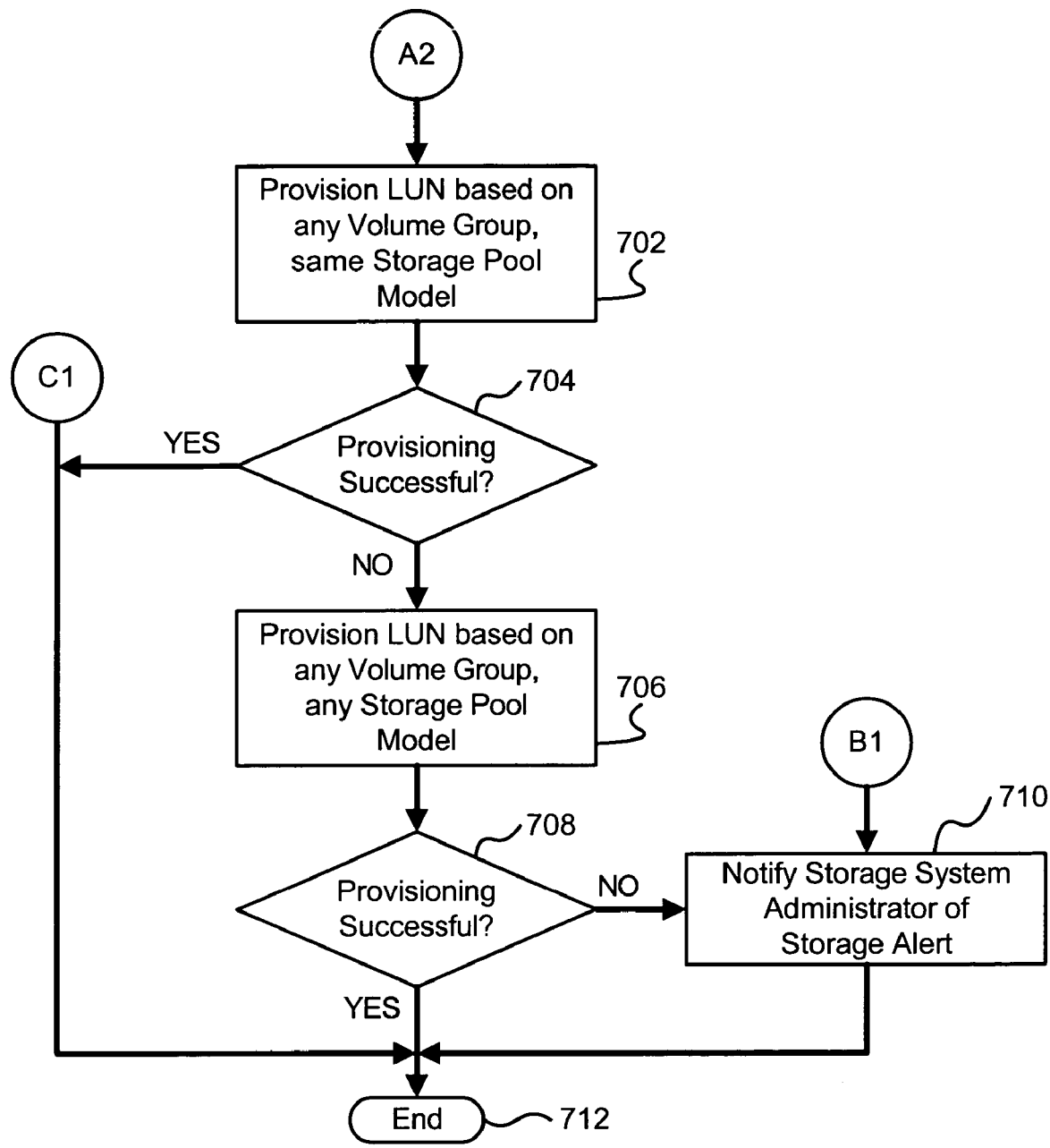

FIGS. 5-7 depict one embodiment of a provisioning process 500 that may be implemented by the storage resource manager server 300 and modeling apparatus 310 of FIG. 3 in provisioning LUNs 214 within the storage system 100. The illustrated provisioning process 500 begins 502 by receiving 504 a storage alert at the storage resource manager server 300 that a LUN 214 needs to be provisioned. For example, a probe or scan of a client machine may reveal that additional storage space should be provided for that client. However, the particular manner in which a storage alert is initiated is not controlling of the present provisioning process 500. Moreover, the modeling specification process 400 and provisioning process 500 are not dependent on the general manner in which storage needs are evaluated and a determination is made to provision additional storage within the storage system 100.

Upon receiving 504 the storage alert, the modeling apparatus 310 determines 506 if automatic LUN 214 provisioning is enabled. In the depicted embodiment, the monitoring module 312 then may identify 508 the client 104, 106 on which the file system 208 to be extended is located.

If LUN 214 provisioning is enabled, the provisioning module 316 of the modeling apparatus 310 attempts to provision a new LUN 214 based on the model LUN 214 and attributes specified by the user. Additionally, the provisioning module 316 preferably attempts to provision the new LUN 214 in the hierarchical order outlined in Table 1. As a result, if a user specifies a modeling policy that allows the model LUN 214 to be from any volume group 214, but requires that the provisioned LUN 214 be created in the same storage pool 222 as the model LUN 214 (Level 3), the provisioning module 316 may initially attempt, in one embodiment, to meet the attributes outlined in the preferred levels 1 and 2 of the hierarchical order.

TABLE 1

LUN Provisioning Hierarchy

| | MODEL GROUP | STORAGE LOCATION |
|---|---|---|
| 1. | Select Model LUN from Same Volume Group of File System to be Extended | Provision LUN in Same Storage Pool as Model LUN |
| 2. | Select Model LUN from Same Volume Group of File System to be Extended | Provision LUN in Same Storage Server as Model LUN |

TABLE 1-continued

LUN Provisioning Hierarchy

| | MODEL GROUP | STORAGE LOCATION |
|---|---|---|
| 3. | Select Model LUN from Any Volume Group of File System to be Extended | Provision LUN in Same Storage Pool as Model LUN |
| 4. | Select Model LUN from Any Volume Group of File System to be Extended | Provision LUN in Same Storage Server as Model LUN |

For example, for every provisioned LUN 214, the provisioning module 316 will first attempt to provision the new LUN 214 in the same storage pool 222 and to model the new LUN 214 after a model LUN 214 from the same volume group 216. In one embodiment, the provisioning module 316 may traverse through the hierarchical levels, as established by a user or administrator, until a new LUN 214 is provisioned with at least the specified attributes or until it is determined that a new LUN 214 cannot be provisioned with at least the specified attributes. If a new LUN 214 cannot be provisioned with at least the specified attributes, the modeling module 310 is configured to inform the system administrator of the provisioning needs of the storage system 100. One example of the hierarchical provisioning steps is set forth in the remaining steps of the provisioning process 500 of FIGS. 6 and 7.

As outlined above, the provisioning module 316 initially attempts to provision 602 a new LUN 214 in the same storage pool 214 as the model LUN 214 and based on a model LUN 214 within the same volume group 216 of the target file system 208 (Level 1). In one embodiment, the modeling apparatus 310 may invoke the modeling identification process 420 of FIG. 4b in order to provision 602 a new LUN 214 according to level 1 of the LUN provisioning hierarchy. The modeling apparatus 310 then determines 604 if the new LUN 214 is successfully provisioned 602. If the new LUN 214 is not successfully provisioned 602, the modeling apparatus 310 determines 606 if the modeling policy specifies that the new LUN 214 must be provisioned in the same storage pool 222 as the model LUN 214.

If the same storage pool 222 is not required, the provisioning module 316 attempts to provision 608 a new LUN 214 in any storage pool 214 of the storage server 116, 118 and based on a model LUN 214 within the same volume group 216 of the target file system 208 (Level 2). In one embodiment, the modeling apparatus 310 may invoke the modeling identification process 420 of FIG. 4b in order to provision 608 a new LUN 214 according to level 2 of the LUN provisioning hierarchy. The modeling apparatus 310 then determines 610 if the new LUN 214 is successfully provisioned 608. If the new LUN 214 is not successfully provisioned 608, the modeling apparatus 310 determines 612 if the modeling policy specifies that the model LUN 214 must be selected from the same volume group 216 of the file system 208 being extended.

If the same volume group 216 is not specified, the provisioning module 316 attempts to provision 702 a new LUN 214 in the same storage pool 214 as the model LUN 214 and based on a model LUN 214 within any volume group 216 of the target file system 208 (Level 3). In one embodiment, the modeling apparatus 310 may invoke the modeling identification process 420 of FIG. 4b in order to provision 702 a new LUN 214 according to level 3 of the LUN provisioning hierarchy. The modeling apparatus 310 then determines 704 if the new LUN 214 is successfully provisioned 702.

If the new LUN 214 is not successfully provisioned 702, the provisioning module 316 attempts to provision 706 a new LUN 214 in any storage pool 214 of the storage server 116, 118 and based on a model LUN 214 within any volume group 216 of the target file system 208 (Level 4). In one embodiment, the modeling apparatus 310 may invoke the modeling identification process 420 of FIG. 4b in order to provision 706 a new LUN 214 according to level 4 of the LUN provisioning hierarchy. The modeling apparatus 310 then determines 708 if the new LUN 214 is successfully provisioned 706.

If at any point in the provisioning process 500 the modeling apparatus 310 determines 604, 610, 704, 708 that the new LUN 214 is successfully provisioned 602, 608, 702, 706 then the illustrated provisioning process 500 ends 712. Likewise, if automatic LUN 214 provisioning is not enabled or if a new LUN 214 is not successfully provisioned within the hierarchical order specified by the modeling policy, the modeling apparatus 310 notifies 710 the storage system administrator of the storage alert and the illustrated provisioning process 500 then ends 712.

Although a specific hierarchical provisioning order has been presented to facilitate the discussion of one embodiment of the present invention, other hierarchical orders may be implemented without departing from the scope of the invention. Likewise, other provisioning policies may avoid hierarchical provisioning strategies and simply attempt to provision a new LUN 214 having the exact attributes specified by a user or administrator.

Similarly, although the embodiments presented above specifically refer to extending storage for a file system 208, other embodiments may provide for extending storage for raw volumes that are not structured with a file system 208 or other file or directory hierarchy. These and other variations are anticipated to fall within the range of equivalency of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A modeling apparatus for provisioning a storage resource, the apparatus comprising:
   a storage device storing executable code;
   a processor executing the executable code, the executable code comprising
   a provisioning module receiving a storage alert for a client in response to detecting a need to extend a file system for the client;
   a specification module specifying a Logical Unit Number (LUN) storage resource of a plurality of storage resources corresponding to the file system as a model storage resource in response to the storage alert;
   a monitoring module monitoring the plurality of existing storage resources and identifying a first storage server and a first storage pool for the model storage resource, wherein the first storage pool comprises the model storage resource and the first storage server manages a plurality of storage pools comprising the first storage pool;
   the provisioning module provisioning a new LUN storage resource for the file system in the first storage pool if the new LUN storage resource can be provisioned in the first storage pool, wherein the new LUN storage resource includes all attributes of the model storage resource; and the provisioning module provisioning the new LUN storage resource for the file system in one of the plurality of storage pools managed by the first storage server if the new LUN storage resource cannot be provisioned in the first storage pool, wherein the new LUN storage resource comprises all of the attributes of the model storage resource.

2. The apparatus of claim 1, wherein the model group comprises a volume group used by the client.

3. The apparatus of claim 1, wherein the new storage resource is assigned to a raw logical volume and expands a storage capacity of the raw logical volume.

4. A system for provisioning a storage resource, the system comprising:
   a client having a file system and comprising a first storage device storing executable code and a first processor executing the executable code;
   a storage resource manager server comprising a second storage device storing the executable code and a second processor executing the executable code, the storage resource server monitoring a plurality of storage resources corresponding to the file system for the client, receiving a storage alert for the client in response to detecting a need to extend the file system, specifying a LUN storage resource as a model storage resource, wherein the model storage resource is one of the plurality of existing storage resources, identifying a first storage server and a first storage pool for the model storage resource, wherein the first storage pool comprises the model storage resource and the first storage server manages a plurality of storage pools comprising the first storage pool, provisioning a new LUN storage resource for the file system in the model storage pool if the new LUN storage resource can be provisioned in the first storage pool, wherein the new LUN storage resource includes all attributes of the model storage resource, provisioning the new LUN storage resource for the file system in one of the plurality of storage pools managed by the first storage server, wherein the new storage resource comprises all of the attributes of the model storage resource; and
   the model storage server managing the model storage resource and the new LUN storage resource.

5. A non-transitory computer readable storage medium storing computer readable code executed by a processor to carry out a process for provisioning a storage resource, the process comprising:
   receiving a storage alert for a client in response to detecting a need to extend a file system for the client;
   specifying a LUN storage resource of a plurality of existing storage resources corresponding to the file system as a model storage resource in response to the storage alert;
   monitoring the plurality of storage resources;
   identifying a first storage server and a first storage pool for the model storage resource, wherein the first storage pool comprises the model storage resource and the first storage server manages a plurality of storage pools comprising the first storage pool;
   provisioning a new storage resource for the file system in the first storage pool if the new LUN storage resource can be provisioned in the first storage pool, wherein the new LUN storage resource includes all attributes of the model storage resource; and
   provisioning the new LUN storage resource for the client in one of the plurality of storage pools managed by the first storage server if the new LUN storage resource cannot be provisioned in the first storage pool, wherein the new storage resource comprises all of the attributes of the model storage resource.

6. The apparatus of claim 1, the attributes of the model storage resource comprising a Redundant Array of Independent Disks (RAID) structure, a redundancy of paths, and a minimum size.

7. The apparatus of claim 6, wherein the file system is an application layer in a storage management environment, the storage management environment further comprising a logical layer and a physical layer, the logical layer comprising the plurality of storage resources.

8. The apparatus of claim 7, the logical layer further comprising a logical volume device driver in the storage management environment that maps each storage resource to a physical volume of a plurality of physical volumes, the physical volumes forming a volume group, each physical volume comprising a stripe of a storage device.

9. The apparatus of claim 8, the provisioning module provisioning the new LUN storage resource in a first volume group of the model storage resource if the new LUN storage resource cannot be provisioned in the model storage pool and one of the plurality of storage pools managed by the model storage server.

10. The system of claim 4, the attributes of the model storage resource comprising a RAID structure, a redundancy of paths, and a minimum size.

11. The system of claim 10, wherein the file system is an application layer in a storage management environment, the storage management environment further comprising a logical layer and a physical layer, the logical layer comprising the plurality of storage resources.

12. The system of claim 11, the logical layer further comprising a logical volume device driver in the storage management environment that maps each storage resource to a physical volume of a plurality of physical volumes, the physical volumes forming a volume group, each physical volume comprising a stripe of a storage device.

13. The system of claim 12, the provisioning module provisioning the new LUN storage resource in a first volume group of the model storage resource if the new LUN storage resource cannot be provisioned in the model storage pool and any storage pool managed by the model storage server.

14. A non-transitory computer readable storage medium of claim 5, the attributes of the model storage resource comprising a RAID structure, a redundancy of paths, and a minimum size.

15. A non-transitory computer readable storage medium of claim 14, wherein the file system is an application layer in a storage management environment, the storage management environment further comprising a logical layer and a physical layer, the logical layer comprising the plurality of storage resources.

16. A non-transitory computer readable storage medium of claim 15, the logical layer further comprising a logical volume device driver in the storage management environment that maps each storage resource to a physical volume of a plurality of physical volumes, the physical volumes forming a volume group, each physical volume comprising a stripe of a storage device.

17. A non-transitory computer readable storage medium of claim 16, the provisioning module provisioning the new LUN storage resource in a first volume group of the model storage resource if the new LUN storage resource cannot be provisioned in the model storage pool and any storage pool managed by the model storage server.

* * * * *